(12) United States Patent
Thomas et al.

(10) Patent No.: US 10,230,456 B2
(45) Date of Patent: Mar. 12, 2019

(54) BRANCHING CONFIGURATION INCLUDING A CROSS-COUPLING ARRANGEMENT TO PROVIDE FAULT TOLERANCE AND TOPSIDE RECOVERY IN THE EVENT OF SUBSEA UMBILICAL ASSEMBLY FAILURE AND SYSTEM AND METHOD INCLUDING SAME

(71) Applicant: SubCom, LLC, Eatontown, NJ (US)

(72) Inventors: Robert B. Thomas, Morris Plains, NJ (US); Adnan Akhtar, Howell, NJ (US); Haifeng Li, Morganville, NJ (US)

(73) Assignee: SubCom, LLC, Eatontown, NJ (US)

( * ) Notice: Subject to any disclaimer, the term of this patent is extended or adjusted under 35 U.S.C. 154(b) by 0 days.

(21) Appl. No.: 15/272,041

(22) Filed: Sep. 21, 2016

(65) Prior Publication Data

US 2018/0083697 A1    Mar. 22, 2018

(51) Int. Cl.
*H04J 14/02* (2006.01)
*H04B 10/032* (2013.01)

(52) U.S. Cl.
CPC .......... *H04B 10/032* (2013.01); *H04J 14/021* (2013.01)

(58) Field of Classification Search
CPC ............ H04J 14/0204; H04J 14/0213; H04J 14/0205; H04J 14/0206; H04J 14/021; H04J 14/0217; H04J 14/0221
USPC .................................. 398/67, 68, 72, 82, 83
See application file for complete search history.

(56) References Cited

U.S. PATENT DOCUMENTS

| | | | | |
|---|---|---|---|---|
| 5,615,290 | A  * | 3/1997 | Harasawa | G02B 6/29332 385/24 |
| 8,009,983 | B2 * | 8/2011 | Zhang | H04B 10/071 398/10 |
| 8,290,361 | B2 * | 10/2012 | Nakano | H04B 10/077 398/10 |
| 8,682,159 | B2 * | 3/2014 | Kovsh | H04J 14/02 398/177 |
| 9,130,672 | B2 * | 9/2015 | Zhang | H04B 10/0771 |
| 9,749,041 | B2 * | 8/2017 | Kram | H04B 10/0773 |
| 2004/0114246 | A1 * | 6/2004 | Polinsky | G02B 6/3518 359/578 |
| 2007/0288211 | A1 * | 12/2007 | MacGregor | G01V 3/083 703/5 |
| 2010/0290786 | A1 * | 11/2010 | Abbott | H04J 14/0204 398/79 |

(Continued)

*Primary Examiner* — Amritbir K Sandhu

(57) ABSTRACT

In general, a branching configuration used in a wavelength division multiplexed (WDM) optical communication system, consistent with an embodiment of the present disclosure, includes a branch path with two or more optical paths cross-coupled to each other to provide redundant add and/or drop channel wavelengths to a branch terminal on each cross-coupled path. Accordingly, a fault condition affecting some of the cross-coupled optical paths may occur physically downstream from the cross-coupling, e.g., within a subsea umbilical cable or associated termination equipment. However, so long as at least one of the cross-coupled optical paths remains operational, then branch terminal equipment in the branch terminal may continue to receive channel wavelengths associated with a faulted optical path via an operational optical path by virtue of cross-coupling. Thus, the cross-coupled configuration reduces or otherwise eliminates the necessity of allocating spare optical paths within the subsea umbilical cable.

20 Claims, 7 Drawing Sheets

(56) References Cited

U.S. PATENT DOCUMENTS

| | | | |
|---|---|---|---|
| 2011/0058815 A1* | 3/2011 | Plentl | B63B 22/16 |
| | | | 398/115 |
| 2011/0135310 A1* | 6/2011 | Kovsh | H04J 14/0221 |
| | | | 398/83 |
| 2011/0200322 A1* | 8/2011 | Kovsh | H04J 14/0209 |
| | | | 398/2 |
| 2011/0233388 A1* | 9/2011 | Nakamura | G01J 3/02 |
| | | | 250/226 |
| 2011/0311216 A1* | 12/2011 | Inoue | H04B 10/0791 |
| | | | 398/1 |
| 2012/0177362 A1* | 7/2012 | Zhang | H04B 10/0773 |
| | | | 398/9 |
| 2013/0020107 A1* | 1/2013 | Pagliuca | H01B 3/441 |
| | | | 174/120 SR |
| 2014/0099098 A1* | 4/2014 | Wang | H04J 14/0201 |
| | | | 398/7 |
| 2015/0256282 A1* | 9/2015 | Manna | H04J 14/0205 |
| | | | 398/83 |
| 2016/0211918 A1* | 7/2016 | Kamalov | H04B 10/2575 |
| 2018/0083697 A1* | 3/2018 | Thomas | H04J 14/021 |

* cited by examiner

BRANCHING CONFIGURATION INCLUDING A CROSS-COUPLING ARRANGEMENT TO PROVIDE FAULT TOLERANCE AND TOPSIDE RECOVERY IN THE EVENT OF SUBSEA UMBILICAL ASSEMBLY FAILURE AND SYSTEM AND METHOD INCLUDING SAME

TECHNICAL FIELD

The present disclosure relates to optical communication systems, and in particular, to a branching configuration including fault protection and recovery options provided by one or more cross-coupled optical paths between a branching unit and a branch terminal, and system and method including the same.

BACKGROUND

To maximize the transmission capacity of an optical communication system, a single optical fiber may be used to carry multiple optical signals in what is called a wavelength division multiplexed system (hereinafter a WDM system). The multiple optical signals may be multiplexed to form an aggregate multiplexed signal or WDM signal with each of the multiple signals being modulated on separate wavelengths referred to as channels. Modern WDM systems have a high traffic capacity, for example, a capacity to carry 100 or more channels at 100 gigabits per second (hereinafter Gb/s) per channel, or more.

The optical transmission system may include a relatively long trunk path (e.g., optical fiber) that may be terminated at a transmitting and/or receiving trunk terminal. The optical transmission system may further include one or more branching units situated along its trunk path. Each branching unit (BU) may be connected to a branch path (e.g., optical fiber) that terminates in a transmitting and/or receiving branch terminal. Each BU may include one or more integral optical add/drop multiplexers (OADM). Channels or wavelengths may be added to and/or dropped from the trunk path of the optical transmission system via the OADMs to direct optical signals on selected channels from and to the branch terminals.

Off-shore branch stations, such as oil and gas platforms, house branch terminal equipment to communicatively couple optical fibers to the trunk path. The branch terminal equipment may terminate branch optical fibers that couple the same to the trunk path, e.g., by way of a branching unit (BU) that includes an OADM arrangement for add/drop functionality. In any event, the optical fiber and associated components (e.g., repeaters, amplifiers, connectors, and so on) may collectively be referred to as a branch path. Subsea umbilical assemblies that include optical fiber, and in some cases power conductors and other elements, may form at least a portion of the branch path. Risers and other such vertical conduit devices may extend from the sea floor and allow the subsea umbilical assembly to couple to topside branch terminal equipment.

Unfortunately, the failure of a subsea umbilical assembly, such as an optical fiber failure due to a cable cut or other mechanical damage, connector path failure, or other interruption, may result in loss of communication between the branch terminal and the trunk path. Operations to repair such a subsea fault often require specialized equipment, e.g., remote operated vehicles (ROVs), and extended periods of time to complete. Downtime during repair of the riser may impact other critical functions of the riser such as delivery of electrical power, fluid and hydrocarbon transfer, and communications between the platform and other elements of the subsea infrastructure. Redundancy of optical fibers within the subsea umbilical assembly may allow for reallocation to "spare" optical fiber pairs. However, such spare optical fiber may not be available in already deployed systems, and riser constraints may significantly complicate bringing spare optical fibers topside.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
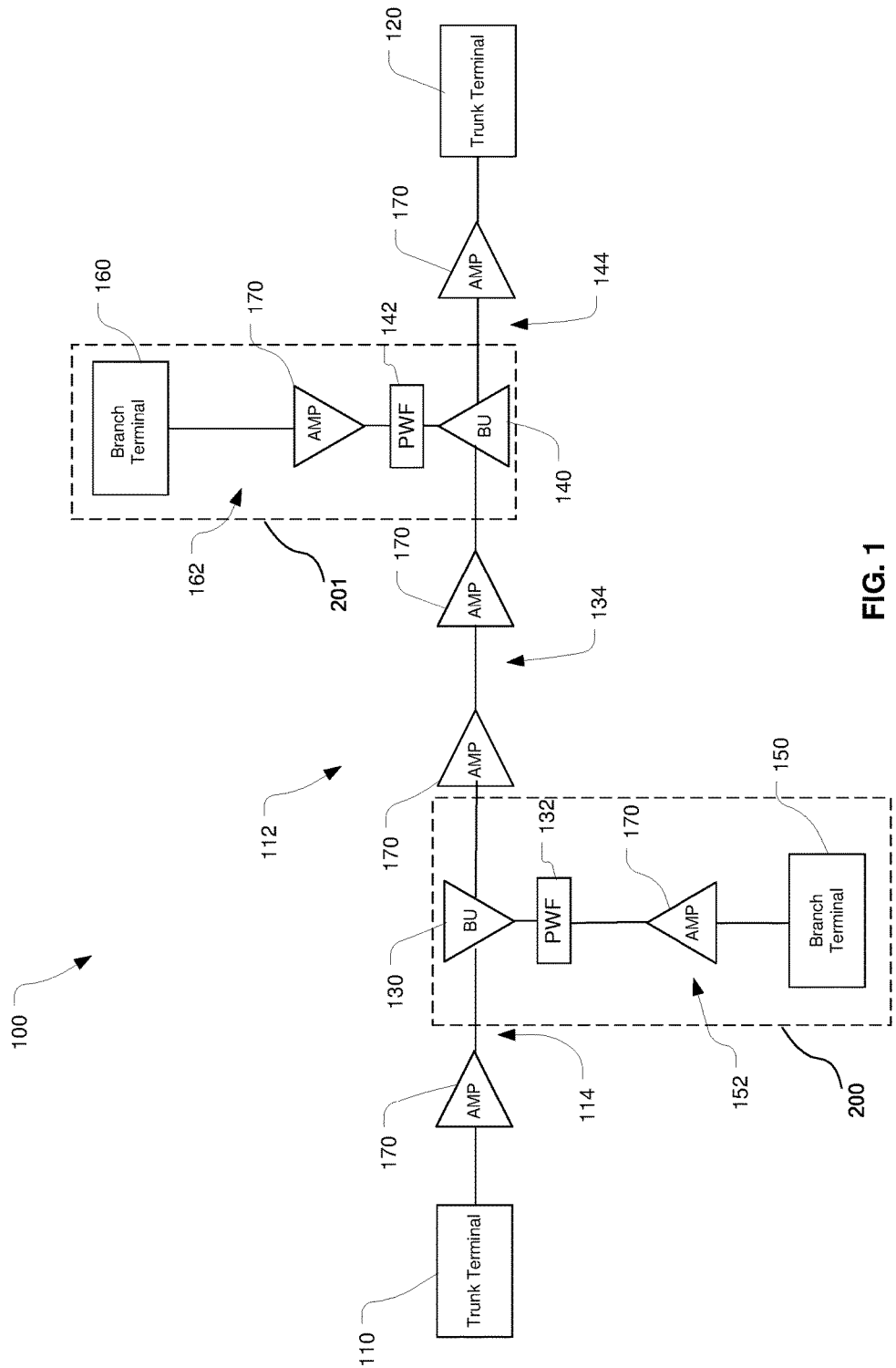
FIG. 1 is a schematic illustration of an optical communication system consistent with an embodiment of the present disclosure.

As discussed above, subsea umbilical cables that include optical fiber, and in some cases power conductors and other elements, may form at least a portion of a branch path between branch terminal equipment of an off-shore facility and the trunk path. Such offshore platforms often include so-called "dry" equipment that allows technicians to service various systems, such as offshore production and control systems and communication equipment, without requiring specialized subsea equipment, such as remotely operated vehicles (ROVs). However, coupling subsea umbilical cables to branch terminal equipment often requires a riser device to bring fibers of the subsea umbilical cable topside. Riser space is often constrained as other high-priority pipes/cabling related to primary operations (e.g., drilling, extracting, refining, and so on) of an off-shore facility occupy a large percentage of available riser space. For instance, a riser may route cabling and/or piping for purposes such as providing power between the off-shore facility and undersea equipment, for transporting hydrocarbons from the seafloor to the off-shore facility, and for providing control fluids and gas lift, for example. Upgrading existing risers to accommodate additional fibers for fault tolerance may be cost prohibitive, e.g., costing millions of dollars and a loss of productivity due to extended downtime. New optical communication systems may be deployed with a sufficient number of backup fibers, but the backup fibers may undesirably occupy space within a riser that may otherwise be used to perform primary operations of an off-shore facility.

Thus, a branching configuration used in a wavelength division multiplexed (WDM) optical communication system, consistent with an embodiment of the present disclosure, includes a branch path with two or more optical paths cross-coupled to each other to provide redundant add channel and/or drop channel wavelengths to a branch terminal in order to provide fault protection and recovery options for an undersea umbilical cable without necessarily allocating spare/backup fibers. Accordingly, fault conditions (e.g., a cable cut, or component failure) affecting some number of the cross-coupled optical paths may occur physically downstream from the cross-coupling, e.g., occurring between the cross-coupling and a branch terminal, within the subsea umbilical cable or associated umbilical termination equipment (UTA), for instance. However, so long as at least one of the cross-coupled optical paths remains unaffected or otherwise operational, then branch terminal equipment, e.g., an optical line card, in the branch terminal may continue to receive channel wavelengths associated with a faulted optical path via an operational optical path by virtue of cross-coupling. In such circumstances, an optical line card associated with a faulted optical path may be "patched" into an operational optical path to continue sending and/or receiving associated channel wavelengths.

Optical jumper devices (or jumper devices) within the branch terminal may allow patching to occur in a manual or automatic fashion to restore communications. In either case, configuration changes to restore optical communication after a fault may occur topside, e.g., on a platform, in a dry environment such as in a server room. Thus, the cross-coupled optical paths of the branching configuration operate, in a general sense, as switchable backup paths that allow for communication to be selectively restored without necessarily performing expensive, complex, and time consuming marine operations. In addition, the branching configurations disclosed herein may limit the number of optical paths necessary within a riser to provide fault protection, and thus, conserve riser space for primary operations of an offshore facility where the branch terminal is located, such as the transfer of hydrocarbons, environmental monitoring via undersea observational equipment, and so on.

In accordance with an embodiment, the branching configuration may further include a branching unit (BU) and a separate predetermined wavelength filter (PWF) unit. The PWF unit may provide one or more optical cross-coupling devices, such as broadband thin-film coupler devices, to optically couple two or more optical paths and provide fault protection and recovery options for a subsea umbilical cable that couples the BU to the separate PWF unit. The PWF unit may also include wavelength selective elements (e.g., filters) for providing a desired wavelength allocation and may also include optical connections (e.g. optical couplers) for coupling the allocated wavelengths between trunk and branch paths in the WDM system. The PWF unit is physically separate from an associated BU but coupled adjacent the BU. In one embodiment, the PWF unit may be located between about 30-200 m from the BU so that, once deployed in an undersea environment, the BU and PWF unit may be retrieved together for repair or replacement operations. In another embodiment, the PWF unit may be positioned a sufficient number of water depths, e.g. two or more water depths, away from the BU so that the PWF unit may be retrieved independently from the BU for repair or replacement.

Turning now to FIG. 1, there is illustrated a wavelength division multiplexed (WDM) optical communication system 100 (or optical system 100) consistent with an embodiment of the present disclosure. The optical communication system 100 has been depicted in highly simplified form for ease of explanation. The optical communication system 100 includes trunk terminals 110, 120 coupled to a trunk path 112. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 112 may include optical fiber in a plurality of optical cable segments, e.g. cable segments 114, 134, 144, for carrying optical signals. Each cable segment may include one or more sections of optical fiber cable including optical fiber pairs and one or more repeaters, and/or subsea optical amplifiers, 170 to provide a transmission path for bi-directional communication of optical signals between trunk terminal 110 and trunk terminal 120.

One or more branching units, e.g., branching units 130, 140, may be coupled to the trunk path 112 between the trunk terminals 110, 120, and one or more associated predetermined wavelength filter (PWF) units, e.g., PWF units 132, 142, may be coupled to, but physically separated from, the branching units 130, 140. One example of an optical system having a PWF being coupled to but physically separate from a branch unit is described in detail in U.S. patent application Ser. No. 12/779,409 filed on May 13, 2010 and entitled "Branching Configuration Including Separate Branching Unit and Predetermined Wavelength Filter Unit and System and Method Including the Same", the entire disclosure of which is herein incorporated by reference in its entirety. However, this disclosure is not necessarily limited in this regard as branching units, e.g., branching units 130, 140, may include an integrated PWF unit and/or other OADM components within a single BU housing. Each PWF unit 132, 142 may be further coupled to a branch terminal, e.g., branch terminals 150, 160, respectively, through an associated branch path 152, 162, respectively. The branching units 130, 140 and respective PWF units 132, 142 together form branching configurations 200 and 201, respectively, that direct optical signals to and from the branch paths 152, 162 and branch terminals 150, 160 by dropping and adding the allocated channel wavelengths, as will be described in greater detail below.

The branch paths 152, 162 may also include optical fiber in optical cable segments to provide a transmission path for bi-directional communication of optical signals. The system 100 may therefore be configured to provide bi-directional communication of optical signals between any of the terminals 110, 120, 150, 160. For ease of explanation, the description herein may refer to transmission from one terminal to another. It is to be understood, however, that the system 100 may be configured for bi-directional or uni-directional communication between any number of the terminals 110, 120, 150, 160. In addition, the system 100 may be configured to support communication via secondary networks such as the Internet using, for instance, a network gateway device (not shown). Similar to the trunk path 112, the branch paths 152, 162 may further include one or more repeaters 170.

The components in the trunk and branch paths may include various configurations for achieving their intended functionality. The repeaters 170, for example, may include any optical amplifier/repeater configuration that compensates for signal attenuation on the transmission path. For example, one or more of the repeaters may be configured as an optical amplifier, such as an erbium doped fiber amplifier (EDFA), a Raman amplifier, or a hybrid Raman/EDFA amplifier. Also, one or more of the repeaters may be provided in an optical-electrical-optical configuration that regenerates an optical signal by converting it to an electrical signal, processing the electrical signal and then retransmitting the optical signal.

The optical communication system 100 may be configured as a long-haul system, e.g. having a length from hundreds to thousands of kilometers between two terminals, which spans a body of water, e.g. an ocean. The branching units 130, 140 and the PWF units 132, 142 may be seated on the ocean floor in an undersea environment. The trunk path 112 may thus span between beach landings.

As shown, the PWF units 132, 142 are not physically located in the BUs 130, 140 or in the branch terminals 150, 160. Instead, the PWF units are physically separate from the BUs and branch terminals and located adjacent or proximate to the BUs in respective undersea housings. The physical separation may facilitate changing the wavelength allocation in the branching configuration by allowing the PWF unit to be replaced or modified without replacing or modifying the BU. As described further below, the PWF units may be located within about 30-200 m from their associated BUs to allow retrieval of both the BU and PWF unit. Alternatively, the PWF unit may be located a sufficient number of water depths (e.g. two or more water depths) from its associated BU to allow retrieval of the PWF unit by a ship operation without retrieving the BU. In one embodiment, for example, the PWF unit may be located about 10-15 km from its associated BU. In general, the PWF unit may be located between 30 m and 50 km from its associated BU.

Deploying the PWF units adjacent the BUs not only allows retrieval of the PWF unit with or separately from the BU, depending on the distance from the BU, but also provides a relatively small (compared to the distance between the BU and the branch terminal) cable length that could possibly be damaged by external forces, thereby providing a low possibility of trunk traffic being interrupted by cable damage. The risk of cable damage affecting trunk traffic extends only to the distance between the BU and its associated PWF unit, as opposed, for example, to the entire length of the branch path in a configuration wherein the wavelength selective elements are provided in a branch terminal. In addition, placing the PWF unit adjacent the BU and not in the branch terminal provides a security feature because trunk traffic that is not allocated to the branch path may be blocked from the branch terminal by the PWF unit, as opposed to being coupled to the branch path and directed to a branch terminal.

In some cases, the PWF units such as PWF units 132, 142 may be integrated into BUs, e.g., collocated within a same BU housing, and this disclosure should not be construed as limited to PWFs having a physical location separate from that of a BU. For example, a BU may include OADM components, such as couplers and filters, that allow a BU to add/drop channel wavelengths to/from a branch terminal. Thus, while examples and scenarios disclosed herein reference a PWF coupled to but physically separated from an associated BU, this disclosure is not necessarily limited in this regard.

In general, a WDM signal may originate at one or more of the terminals and may include a plurality of multiplexed optical signals modulated on a plurality of different channel wavelengths. One or more channels may be allocated as express channels configured to travel uninterrupted through the trunk path 112 from an originating trunk terminal through the BUs and PWFs and to a receiving trunk terminal. One or more other channels may be local channels that are added and dropped by the PWFs to/from the branch terminals.

For example, a signal that originates at trunk terminal 110 may include one or more information signals occupying one or more channels (e.g., express channels and local channels). Likewise, a signal that originates at branch terminal 150 may also include one or more information signals occupying one or more channels (e.g., local channels). Both the trunk and branch signals may be transmitted to PWF unit 132, e.g. through the branching unit 130 in the case of the signals originating from the trunk terminal. Channels carrying information signals may also be referred to as utilized channels. The trunk and branch signals may also include loading signals on channels without information signals, referred to as unutilized channels, to maintain uniform channel loading. A loading signal may include a non-information carrying signal such as broadband noise, e.g. ASE noise, ASE noise band or a dummy tone. Dummy tones generally refer to optical energy that is centered on a specific wavelength and that does not carry information or traffic.

Any express channels may be passed from the originating trunk terminal to the trunk path directly through the BU or PWF unit without interruption. One or more local channels may be dropped from the trunk path or added to the trunk path at the PWF units. PWF unit 132 may be configured to drop, i.e. extract, one or more local channel wavelengths carrying information signals originating from the trunk terminal 110. The information signals on the dropped local channels may then be passed to the branch terminal 150. PWF unit 132 may also be configured to add, i.e. insert, one or more local channel wavelengths carrying information signals originating from the branch terminal 150 to the trunk path 112. The resulting WDM optical signal, i.e. including the added information signals, may then be passed onto the trunk path 112 (e.g., onto segment 134 following the BU 130). The resulting WDM optical signal may be received by PWF unit 142, e.g. through branching unit 140, and the PWF unit 142 may similarly add and/or drop one or more local channels carrying information signals. The local channels carrying information signals that originate at other terminals may be similarly added and/or dropped at PWF unit 142 and/or PWF unit 132.

Figure 2:
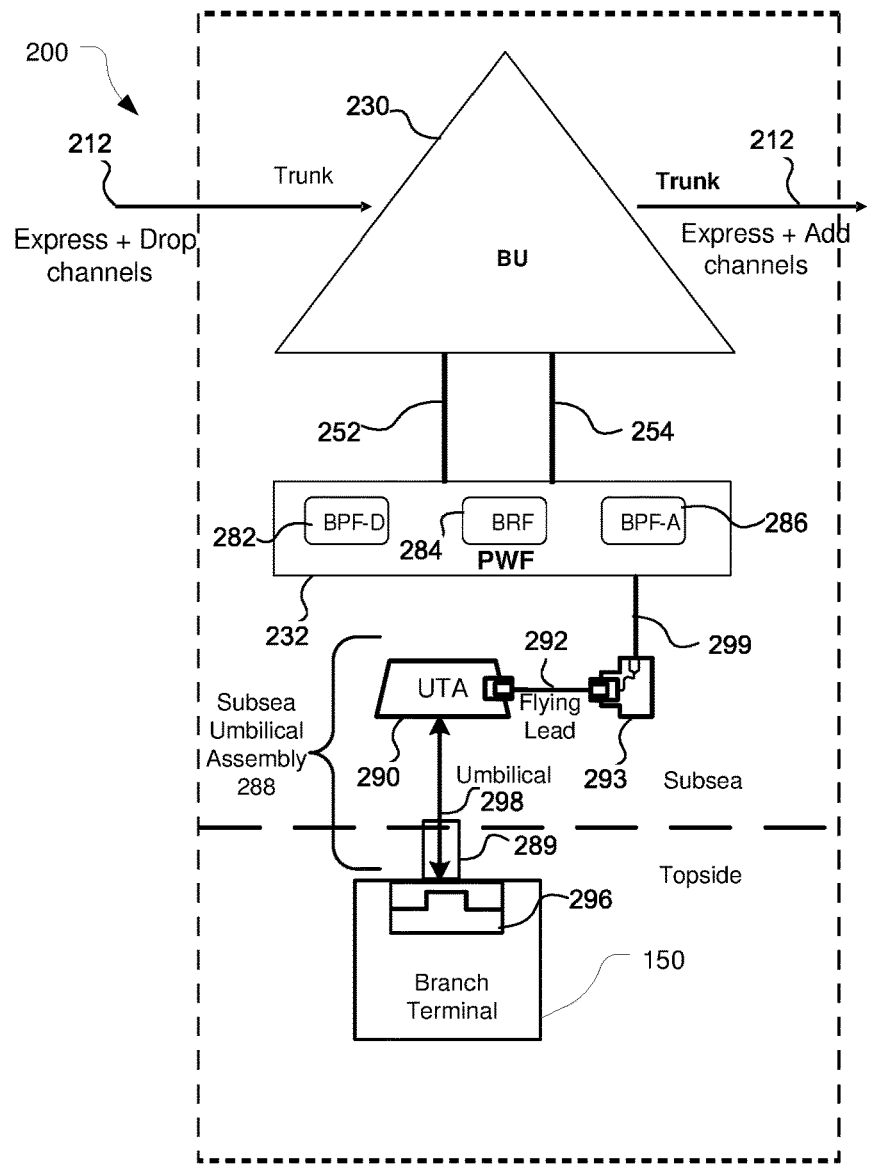
FIG. 2 is a schematic illustration of an embodiment of a branching configuration including a branching unit (BU) and separate predetermined wavelength filter (PWF) unit consistent with an embodiment of the present disclosure.

FIG. 2 shows a diagram of an example branching configuration 200 consistent with an embodiment of the present disclosure. As shown, the branching configuration 200 includes a BU 230 coupled to trunk path 212 (e.g., optical fibers) and an associated PWF unit 232 coupled to, but physically separate from, the BU 230 and coupled to drop and add branch paths 252, 254 (e.g., optical fibers). The trunk path 212 is illustrated as a single path for simplicity, but should not be construed as limited in this regard. For example, the trunk path 212 may include a redundant east-west configuration whereby optical signals are redundantly transmitted and received via signals traveling opposite directions, such as shown in FIGS. 3-7. Likewise, drop branch path 252 and add branch path 254 may include N number of optical paths, e.g., to accommodate east-west redundancy, and are not necessarily limited to only two paths, as shown.

The trunk path 212 may carry express channels and local channels, which are managed by the branching configuration 200. As shown, express channels pass through the branching configuration 200 from one trunk terminal to a receiving trunk terminal. One or more local channels (also referred to as drop channels) may pass through the branching configuration 200 from trunk path 212 to drop branch path 252. One or more local channels (also referred to as add channels) may pass through the branching configuration 200 from add branch path 254 to trunk path 212.

The adding and dropping of the local channel wavelengths is generally referred to as optical add drop multiplexing (OADM). To implement OADM in the branching configuration 200, for example, the branching configuration 200 may implement the following functions: splitting, filtering and combining. The splitting function involves splitting optical power on one input fiber into two or more outgoing fibers. An optical coupler is one example of a device that can implement the splitting function. The filtering function involves blocking at least a portion of an input optical spectrum (i.e., one or more wavelengths) from one or more outgoing fibers while allowing other wavelengths to pass. Optical filters that transmit some wavelengths and block one or more specific wavelengths can be implemented using technologies such as thin film optical filters and fiber Bragg gratings, for example. The filtering function may also involve filtering using filter configurations that do not discriminate by optical wavelength such as, for example, an attenuator and an all-pass filter. The combining function involves merging optical signals from two or more sources onto a single output fiber. An optical coupler is one example of a device that can implement the combining function.

The OADM functionality in the undersea branching configurations referenced in this disclosure may be implemented using optical devices of fixed optical characteristics. The OADM functionality may also be implemented using optical devices for which the optical coupling and/or optical filtering characteristics may be changed or controlled in an installed branching configuration using local or remote control signals to the devices. In one example, an undersea system operator may transmit a control command to the BU and/or PWF unit as an optical signal transmitted through the optical fibers in the undersea system cables. Examples of controllable optical devices that may be used to provide OADM functionality include, without limitation, optical switches, tunable optical filters, variable optical attenuators, wavelength selective switches, and reconfigurable optical add drop multiplexers (ROADMs).

The branching configuration 200 may be implemented with any subset of the required splitting and combining functions implemented in the BU 230 with the remainder of the splitting and combining functions implemented in the PWF unit 232. Although some filtering functions may be implemented within the BU 230, the filtering functions specific to the OADM wavelength allocation process may be implemented in the PWF unit 232. In the illustrated embodiment, the PWF unit 232 includes a drop band pass filter (BPF-D) 282 for passing that portion of the total optical spectrum of the trunk path required by the branch path, an add band pass filter (BPF-A) 286 for passing that portion of the branch path optical spectrum to be added to the trunk path, and a band reject filter (BRF) 284 for rejecting or blocking trunk path channel wavelengths to be reused when channel wavelengths are added.

As further shown, the branching configuration 200 includes a subsea umbilical assembly 288 collectively defined by optical fiber cable 299, deployment pallet (DP) 293, flying lead 292, umbilical termination assembly (UTA) 290, and a subsea umbilical cable 298, although other configurations are within the scope of this disclosure. For instance, the UTA 290 may couple to the PWF unit 232 without the fiber cable 298, DP 293 and flying lead 292. While the optical fiber cable 299, flying lead 292, and subsea umbilical cable 298 are illustrated as a single line, each may include multiple paths, e.g., fibers, for purposes of sending signals to/from the trunk path 212 to the branch terminal 150.

Continuing on, the subsea umbilical assembly 288 may couple to the PWF unit 232 by way of the DP 293, with an input of the DP 293 coupled to the PWF unit 232 by way of optical fiber cable 299. The DP 293 may be coupled to an umbilical termination assembly (UTA) 290 by a connector 292, which may also be referred to as a flying lead. In some cases, the flying lead is about 100 meters in length, although other lengths are within the scope of this disclosure. The UTA 290 provides termination for the umbilical cable 298 and various connectors, e.g., wet-mate connectors, for coupling to the DP 293 and the subsea umbilical 298 cable. The subsea umbilical cable 298 may include, for example, a plurality of optical fiber pairs, one or more electrical conductors, piping/hosing for hydraulics, chemical (e.g., hydrocarbons), air, gas and water transfer, or any combination thereof. In some cases, the subsea umbilical cable 298 comprises a first umbilical cable for optical communication and power distribution, and a second umbilical cable for oil and gas transfer, for example.

Thus, subsea umbilical cables can provide a range of capabilities and, in the context of optical communication, the plurality of optical fibers within a subsea umbilical cable allow for high bandwidth communication, sometimes referred to as broadband communication. In addition, umbilical cables may include power conductors designed to distribute power to N number of subsea elements, e.g., wells and supporting systems, and to topside elements, such as equipment located on one or more platforms within a given branch configuration. Power may also be distributed via the trunk path 212 from power feed equipment (PFE) located at the stations 110 and 120, for instance. Alternatively, or in addition to power provided via the trunk path 212, subsea umbilical cables may also include power conductors designed to provide power generated by a platform, e.g., from a diesel generator, to power equipment along a given branch path. To this end, the subsea umbilical cable 298 may include any number of optical and electrical paths for unidirectional and/or bidirectional communication.

The riser 289 may extend from the seafloor to a topside platform that houses equipment of the branch terminal 150. The riser 289 brings at least a portion of the subsea umbilical cable 298, e.g., one or more fibers, topside for coupling with terminal equipment 296, with terminal equipment 296 providing optical line cards and one or more transceiver systems for sending/receiving channel wavelengths, e.g., add/drop channels. The riser 289 may comprise any suitable riser type including a flexible riser, an attached riser, a pull tube riser, and/or a steel catenary riser (SCR), just to name a few.

Branching configurations referenced herein may be implemented by cross-coupling optical paths within a PWF, such as PWF unit 232, or by cross-coupling optical paths within other components along a branch path, such as the UTA 290 or associated wet-mate connectors. Accordingly, while some specific examples and scenarios disclosed herein show a PWF having cross-coupling devices, other embodiments are within the scope of this disclosure. In some cases, it may be desirable to position the cross-coupling devices as close to an associated BU as possible. Positioning the cross-coupling devices in this manner may ensure that a large portion of the downstream branch path is protected in the case of subsea faults. Positioning the cross-coupling devices within the BU is also within the scope of this disclosure.

Figure 3:
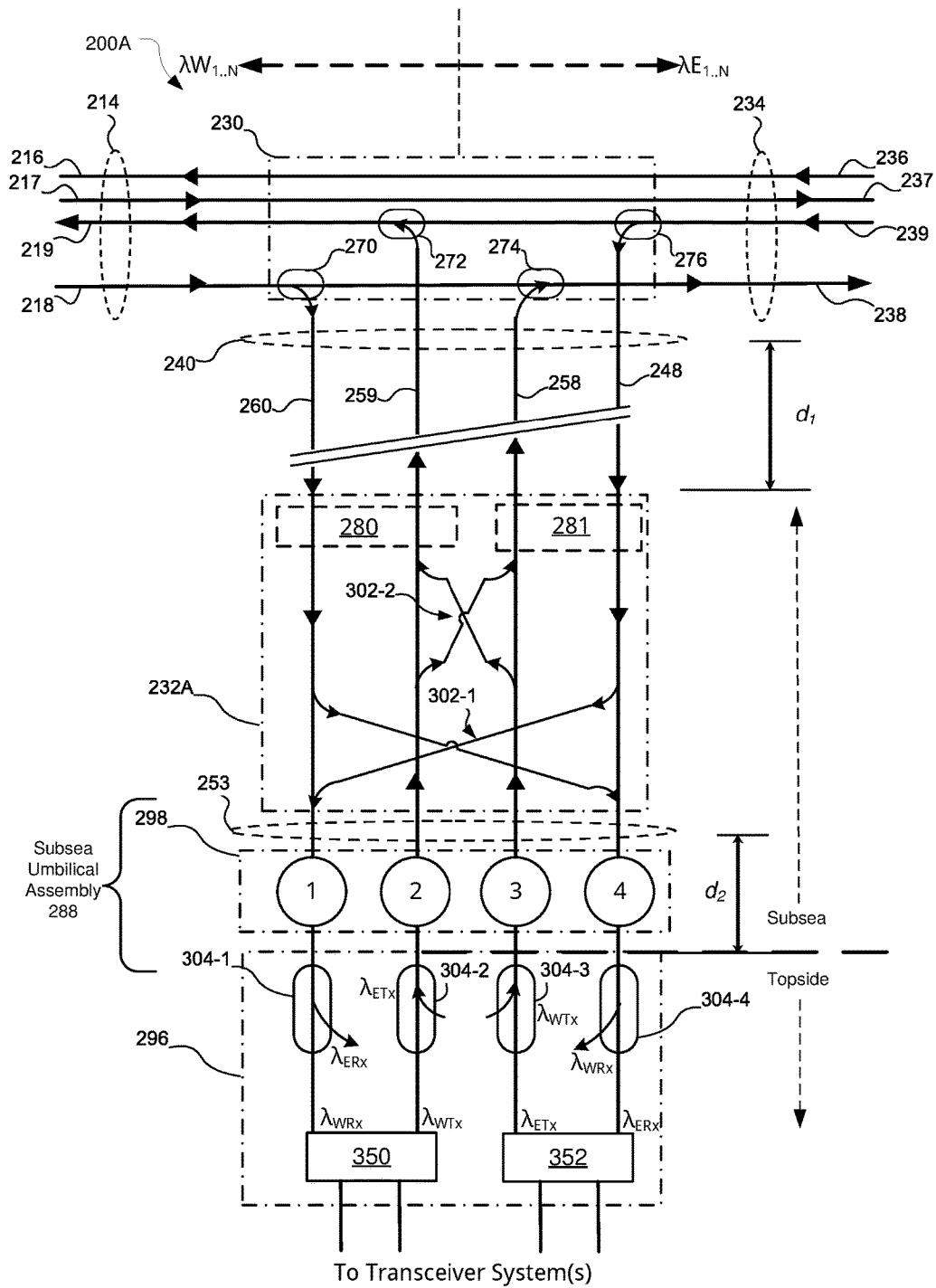
FIG. 3 illustrates an example branching configuration having a cross-coupled arrangement along a branch path, in accordance with an embodiment of the present disclosure.

Turning now to FIG. 3, a schematic view illustrates a branching configuration 200A with a cross-coupling arrangement within the PWF unit 232A to provide east-west redundancy without necessarily allocating or otherwise dedicating standby/backup optical fibers within the subsea umbilical cable 298. As previously discussed, a branching configuration consistent with an embodiment of the present disclosure may be implemented with any subset of the splitting and combining functions implemented in the BU and with the remainder of the splitting and combining functions implemented in the associated PWF unit. For example, the OADM splitting and combining functions are contained within the BU 230 and OADM filtering functions are implemented in the PWF unit 232A.

The PWF unit 232A includes add/drop filter sets 280, 281 for filtering the trunk and branch signals as described above. In the example embodiment, one add/drop filter set 280 filters the trunk and branch signals to provide a range of wavelengths for bidirectional communication to one trunk terminal through a fiber pair in the branching configuration 200A, and the other add/drop filter set 281 filters the trunk and branch signals to provide a range of wavelengths for bidirectional communication to the other trunk terminal through the other fiber pair in the branching configuration 200A. The add/drop filter sets 280, 281 may include combinations of the BPF-A, BPF-D and BRF filters described above, for performing a predetermined desired wavelength allocation.

As further shown, trunk cables 214, 234 terminate on the BU 230 with two (2) fiber pairs (four (4) fibers totals) in each cable forming trunk paths that provide bi-directional, redundant east-west communication, as indicated by the one or more east-west channel wavelengths $\lambda W_{1...N}$ and $\lambda E_{1...N}$. Pass-through trunk fibers 216, 217, 236, 237 provide direct trunk paths through the BU 230, which carry express channels in each direction. OADM trunk fibers 218, 219, 238, 239 are coupled to the PWF unit 232A to provide the OADM functionality and may carry both express channels and local channels.

Inbound OADM trunk fibers 218, 239 may be coupled to drop branch fibers 260, 248, respectively to drop channels from each direction. Outbound OADM trunk fibers 219, 238 may be coupled to add branch fibers 259, 258, respectively to add channels in each direction. In this embodiment, the BU 230 may include couplers 270, 272, 274, 276 for splitting and combining the channels to/from the trunk fibers 218, 219, 238, 239. Branch cable segment 240 including the OADM trunk fibers 218, 219, 238, 239 are coupled to the BU 230 and the PWF unit 232A.

The PWF unit 232A includes first and second cross-coupling members 302-1, 302-2 respectively. The first and second cross-coupling members 302-1, 302-2, optically couple respective optical fibers of the subsea umbilical assembly 298, which may be referred to herein as optical paths. Optical cable segment 253 may include a plurality of optical fibers and couple the PWF unit 232A to the subsea umbilical cable 298. More than two fibers may be cross-coupled in this manner, depending on a desired configuration.

One example device for use the as the cross-coupling members 302-1, 302-2 include thin-film broadband couples. A first optical path, e.g., formed in part by OADM trunk fiber 218 and branch fiber 260, is configured to receive inbound channel wavelengths (e.g., drop channels) from a first direction, e.g., from the west, with the received inbound wavelengths being denoted by $\lambda_{WRx}$. A second optical path, e.g., formed in part by OADM trunk fiber 219 and branch fiber 259, is configured to provide outbound channel wavelengths (e.g., add channels) along the trunk path 212 (FIG. 2) away from the BU 230 in the first direction, with the outbound channel wavelengths being denoted by $\lambda_{WTx}$. A similar arrangement provides add/drop capability in a second direction, e.g., to the east. For instance, a third optical path is formed in part by OADM trunk fiber 238 and branch fiber 258, and a fourth optical path is formed in part by OADM trunk fiber 239 and branch fiber 248. The third and fourth optical paths are configured to provide add/drop channel wavelengths $\lambda_{ETx}$ and $\lambda_{ERx}$, respectively, along the second direction, e.g., the east.

Figure 4:
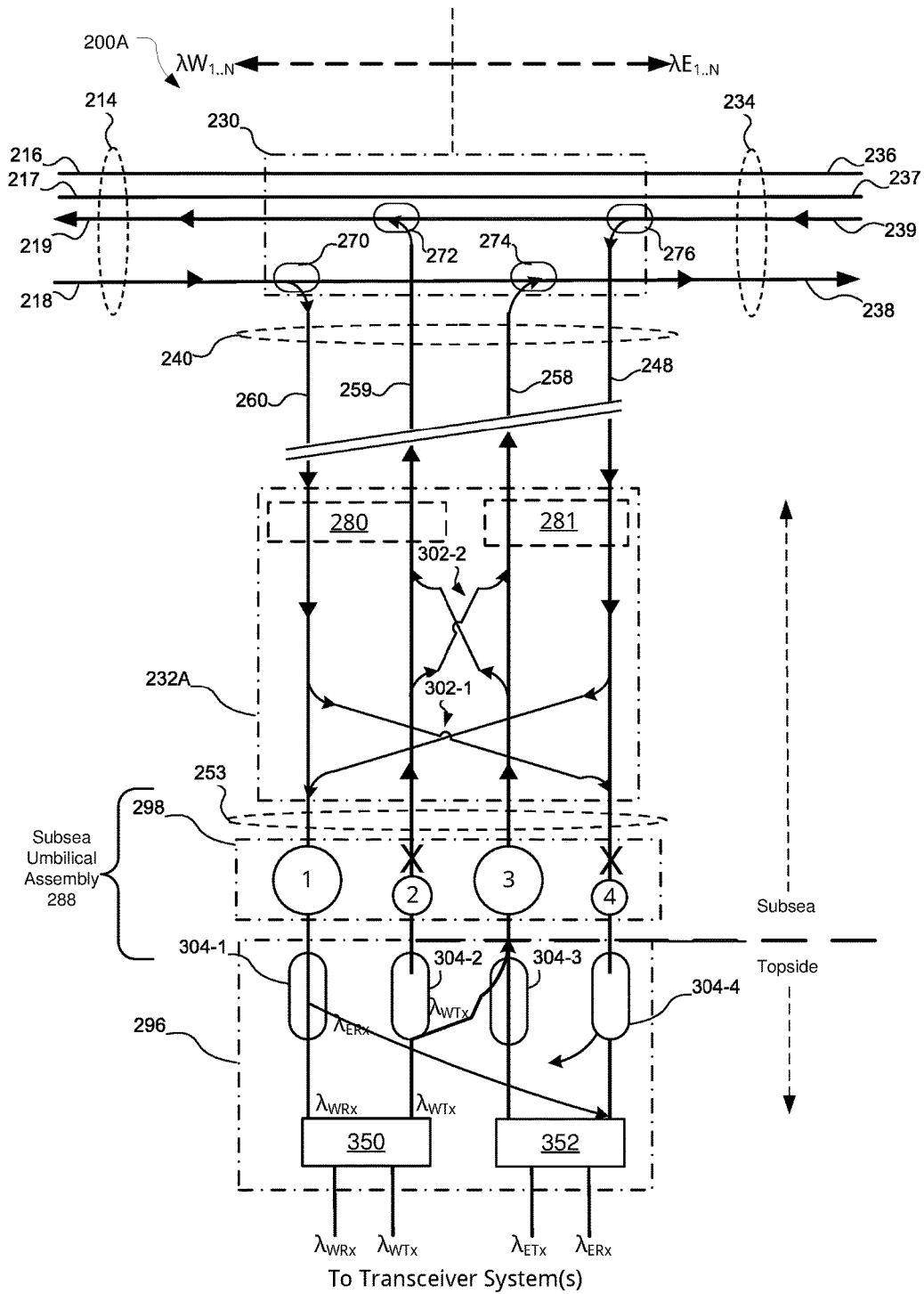
FIG. 4 illustrates the example branching configuration of FIG. 3 in the event of one or more fault conditions occurring along the branch path, in accordance with an embodiment of the present disclosure.

While the PWF unit 232A is illustrated in FIGS. 3 and 4 as having the cross-coupling arrangement, this disclosure is not necessarily limited in this regard. For instance, the cross-coupling arrangement including the first and second cross-coupling members 302-1 and 302-2 may be disposed in other components of the subsea umbilical subassembly 288 such as within the UTA 290, for example. Likewise, a cross-coupling arrangement may be implemented in a connector or coupling member, such as a wet-mate connector that couples the DP 293 to the UTA 290. Moreover, while the cross-coupling arrangement shown in FIG. 4 includes two coupling members 302-1 and 302-2 to accommodate redundant east-west optical paths, other configurations are within the scope of this disclosure. For instance, any number of coupling members may be used within a cross-coupling arrangement to account for N number of redundant optical paths. In some cases, a single cross-coupler may be used, such as shown and described in greater detail below with regard to FIG. 5.

Continuing with FIG. 3, the PWF unit 232A includes a first cross-coupling member 302-1 and a second cross-coupling member 302-2. The first cross-coupling member 302-1 optically cross-couples the first and fourth optical paths, denoted as (1) and (4), respectively, and the second cross-coupling member 302-2 optically cross-couples the second and third optical path, denoted as (2) and (3), respectively. Thus, channel wavelengths introduced on the first optical path are also introduced onto the fourth optical path, and vice-versa. Likewise, channel wavelengths introduced on the second optical path are also introduced onto the third optical path, and vice-versa. Two or more optically cross-coupled fibers may be collectively referred to as a cross-coupled optical path. For example, cross-coupled optical paths denoted as (1) and (4) may be collectively referred to as a first cross-coupled optical path, and optical paths denoted as (2) and (3) may be collectively referred to as a second cross-coupled optical path.

The optical communication system 100 may use one or more unique channel wavelengths for each of the add/drop channels in each direction. For instance, the branch configuration 200A of FIG. 3 may include at least four (4) unique channel wavelengths for each of wavelengths $\lambda_{WRx}$, $\lambda_{ERx}$, $\lambda_{WTx}$, $\lambda_{ERx}$. In some cases, each channel wavelength $\lambda_{WRx}$, $\lambda_{ERx}$, $\lambda_{WTx}$, $\lambda_{ERx}$ is a plurality of associated channel wavelengths. As unique channel wavelengths may be utilized, the east-bound channel wavelengths may be launched along west-bound fibers, e.g., OADM trunk fibers 219, 218 respectively, and the west-bound channel wavelengths may be launched along east-bound fibers, e.g., OADM trunk fibers 239, 238 respectively, without collision or otherwise introducing a conflict.

As previously discussed, the distance the cable segment 240 extends between the BU 230 and the PWF unit 232 can measure a distance of $d_1$ between 30 m and 50 km, and in some non-limiting cases, at least one to two water-depths. The distance which the cable segment 253 and subsea umbilical cable 298 extends may measure a distance of $d_2$ between 30 m and 50 km, and in some non-limiting cases, at least one to two water-depths. However, this disclosure is not necessarily limited in this regard as the PWF unit 232 may be physically located in a same housing as the BU 230. In these cases, a relatively short length of fiber (or a waveguide device or other suitable coupling) couples the BU 230 and the PWF unit 232.

The subsea umbilical cable 298, or at least a portion thereof (e.g., one or more fibers) may be brought topside via a riser, such as the riser 289 as discussed above with regard to FIG. 2. A dry-mate connector (not shown) of the terminal equipment 296 couples optical paths, e.g., optical fiber, of the umbilical cable 298 to transceiver components such as east and west optical line cards 352, 350. West and east line cards 350, 352 may also be referred to as first and second line cards, respectively. Each of the east and west line cards 352, 350 may be coupled to respective optical transceiver systems. The east and west line cards 352, 350 may include input and output ports (not shown). In some cases, east and west line cards 352, 350 are a single line card having multiple input and multiple output ports.

The terminal equipment 296 also includes jumpers 304-1 to 304-4 (which may also be referred to as jumper devices or optical jumper devices). As discussed further below, jumpers 304-1 to 304-4 may be engaged/switched to couple or decouple one or more of the optical paths of the east and west line cards 352, 350 in the event of a fault or other interruption along the subsea umbilical cable 298. Thus, non-faulted or otherwise operational optical paths may be "patched" into an appropriate line card to continue to send and/or receive associated channel wavelengths.

For instance, the first jumper 304-1 may be switched to couple the receive port of the east line card 352 to the first optical path, e.g., the optical path denoted as (1), in order to provide drop channel wavelengths $\lambda_{ERx}$ in the event of a fault condition along the fourth optical path, e.g., the optical path denoted as (4). At the same time, switching the first jumper 304-1 may also decouple the east line card 352 from the fourth optical path. As a result, the east line card 352 continues to receive associated channel wavelengths, e.g., wavelengths $\lambda_{ERx}$, and can simply filter out or otherwise ignore unassociated channel wavelengths, e.g., wavelengths $\lambda_{WRx}$. In similar fashion, the second and third jumpers 304-2 and 304-3 may be configured to break/decouple optical communication with an associated second optical path denoted as (2), and the third optical path denoted as (3), respectively, and couple the east line card 352 to a non-faulted or otherwise operational west-bound optical path, e.g., the second optical path (2), or the west line card 350 to a non-faulted or otherwise operational east-bound optical path, e.g., the third optical path (3). Jumpers 304-1 to 304-4 may therefore include at least two positions, namely at least a first position that couples a line card to a primary optical path, and a second position that couples a line card into a backup optical path provided by virtue of cross-coupling.

Accordingly, the jumpers 304-1 to 304-4 of the branch terminal equipment 296 may enable selective reconfiguration to restore east-west transceiver connectivity in a dry, topside manner without necessarily performing marine operations to repair or reconfigure the subsea umbilical assembly 288. In this example embodiment, the necessity of having backup fibers available and brought topside by the riser 289 is reduced or otherwise eliminated as each drop channel optical path, e.g., the first and fourth optical paths denoted by (1) and (4), and each add channel optical path, e.g., the second and third optical paths denoted by (2) and (3), operate as switchable backups for each other by virtue of cross-coupling. Thus, the branching configuration 200A allows for topside reconfiguration in the event one of the drop channel optical paths and/or one of the add channel optical paths become disabled/degraded by a fault condition, such as a cable cut.

Switching of the jumpers 304-1 to 304-4 in response to a fault condition may be manual, e.g., performed by a technician located in physical proximity of the jumpers 304-1 to 304-4, or may be automated by a fault monitoring system. For instance, switching of the jumpers 304-1 to 304-4 may occur automatically if a fault is detected by monitoring equipment. In other cases, monitoring equipment may send a signal or "alert" to a workstation, e.g., within a network operations center (NOC), in the event of a failure. A technician within the NOC, or an automated process, may then transmit a signal, e.g., via optical transmission lines of the optical communication system 100, to cause one or more of the jumpers 304-1 to 304-4 to switch and restore connectivity. Such a signal may be sent via the trunk 112 to the terminal equipment 296 and/or via a secondary network as the Internet.

One specific non-limiting example scenario of recovery using jumpers 304-1 to 304-4 in combination with the cross-coupled configuration of the branching path 200A will now be discussed in greater detail. Turning to FIG. 4, with additional reference to FIG. 2, the branching configuration 200A is illustrated with a fault condition that interrupts communication along one or more optical paths of the branch configuration 200A, in accordance with an embodiment of the present disclosure. The fault condition may be related to a single event, e.g., a cable cut, or separate events that occur over time that disable or otherwise degrade power along one or more optical paths. The fault condition may occur at any position downstream from where optical paths are cross-coupled within a trunk path including but not limited to, the UTA 290, the PWF unit 232A, associated wet-mate connectors, the subsea umbilical cable 298, branch cable segment 253, and topside connectors, or any combination thereof.

As shown, a fault condition has occurred within the second and fourth optical paths, paths denoted as (2) an (4), respectively. To remedy the fault, jumper 304-2 switches from a first position to a second position which decouples the west line card 350 from the second optical path and then couples the west line card 350 to the third optical path, which was unaffected or otherwise operational despite the fault condition. To this end, transmission of both west-bound and east-bound channel wavelengths $\lambda_{WTx}$, $\lambda_{ETx}$ respectively continue along OADM trunk fibers 219, 238 by virtue of the second optical cross-coupling member 302-2. In addition, jumper 304-1 may switch from a first position to a second position to decouple the east line card 352 from the fourth optical path and couple the east line card 352 to the first optical path, which was unaffected or otherwise operational despite the fault condition. The east line card 352 then continues to receive associated channel wavelengths $\lambda_{ETx}$ via the first optical path by virtue of the first optical cross-coupling member 302-1.

Figure 5:
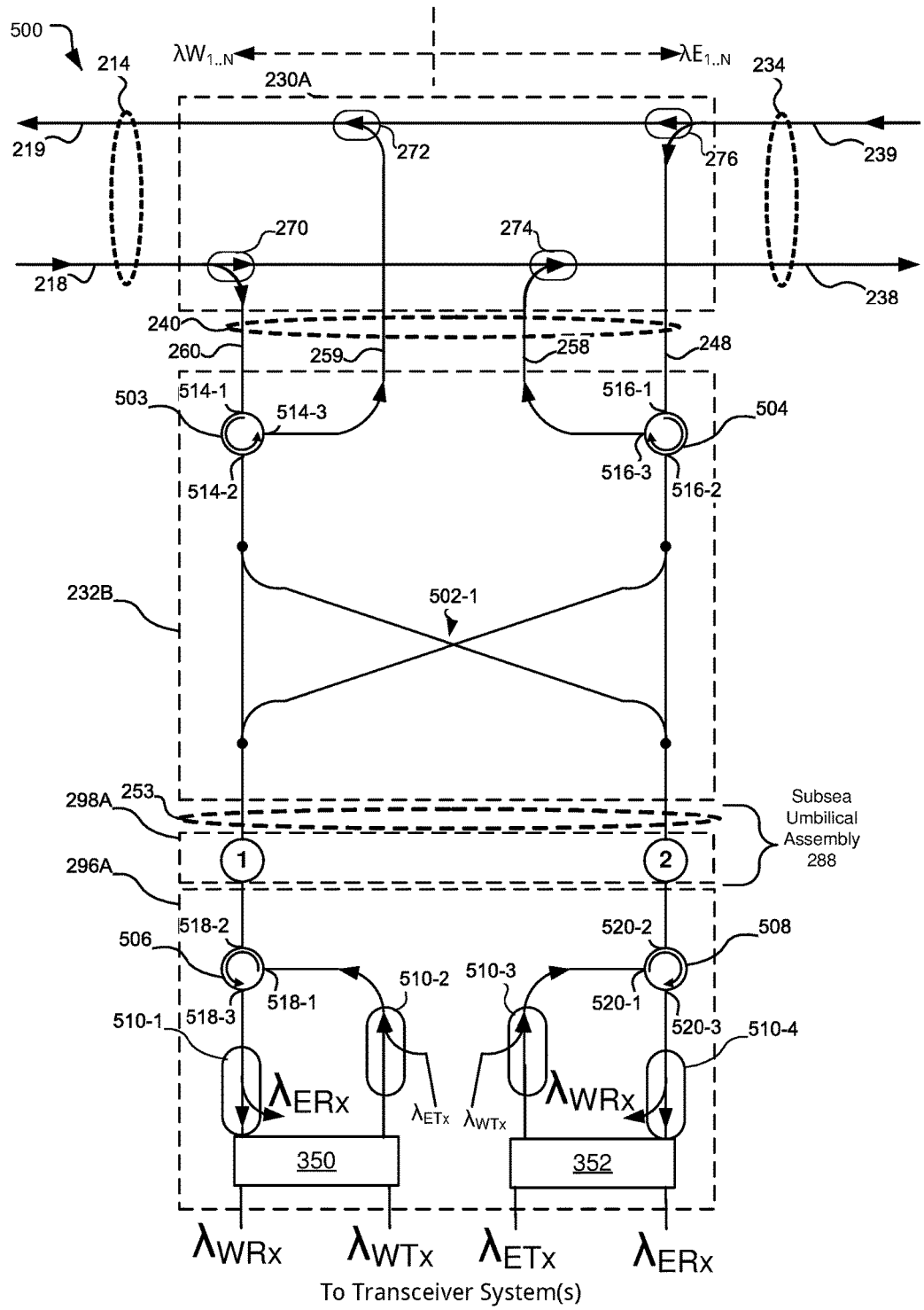
FIG. 5 illustrates another example branching configuration having a cross-coupled arrangement along a branch path, in accordance with an embodiment of the present disclosure.

In some scenarios, a branching configuration may include a limited number of available add/drop paths, e.g., fibers, for dropping channel wavelengths to a branch terminal and adding channel wavelengths from the branch terminal to the trunk. FIG. 5 shows one such example branching configuration 500 that includes a constrained number of optical paths within the undersea umbilical assembly cable 298A. The branching configuration 500 is shown in a highly simplified form and other embodiments are within the scope of this disclosure. For instance, the BU 230A may be implemented with pass-through trunk fibers 216, 217, 236, 237.

As shown, the branching configuration 500 is configured similar to that of the branching configuration 200A of FIG. 3 and includes the PWF unit 232B coupled to but physically separated from the BU 230A, e.g., by at least 30 meters. Note that the PWF unit 232A, 232B (FIG. 6) and 232C (FIG. 7) may include filter sets 280, 281, as discussed above, to implement OADM functionality but are not shown merely for clarity.

Continuing on, in the example embodiment of FIG. 5, the subsea umbilical cable 298A includes a relatively constrained number of optical paths to add/drop channel wavelengths to/from the trunk 112. In particular, the subsea umbilical cable 298A includes only a first and a second optical path denoted as one (1) and (2), respectively, that couple to the PWF unit 232B.

To provide channel wavelengths to/from the trunk 112 in a redundant manner, e.g., in both east and west directions, the PWF unit 232B includes a single cross-coupling member 502-1 that cross-couples the first and second paths. Therefore, drop channel wavelengths received via OADM trunk fibers 218 and 239, e.g., $\lambda_{WRx}$ and $\lambda_{ERx}$, are provided on both the first and second optical paths in a redundant manner. Likewise, add channel wavelengths from the terminal equipment 296, e.g., $\lambda_{WTx}$ and $\lambda_{ETx}$, are passed in a redundant manner along both the first and second optical paths.

As further shown, the PWF unit 232B includes a first optical circulator 503 coupled along the first optical path, and a second optical circulator 504 coupled along the second optical path. The first optical circulator 503 includes a plurality of ports, such as a first port 514-1, a second port 514-2 (which may also be referred to as bi-directional port 514-2), and a third port 514-3, as shown. Optical circulators, such as the first and second optical circulators 503, 504 can be used to separate optical signals that travel in opposite directions in an optical path. The first and second optical circulators 503, 504 include a three-port configuration whereby signals entering any port exits from the next. Accordingly, signals entering the first port 514-1 of the first optical circulator 503 exits via the second port 514-2, and signals entering the second port 514-2 exits via the third port 514-3. Likewise, the first, second and third ports 516-1, 516-2, 516-3, respectively, of the second optical circulator 504 operate in similar fashion. Accordingly, the PWF unit 232B allows for bi-directional communication via the first and second optical paths to comport with the constraints of the umbilical assembly cable 298A without introducing signal degradation by providing add channel wavelengths onto inbound OADM trunk fibers 218 and 239, for example.

The terminal equipment 296A may also include circulators, such as the third optical circulator 506 and fourth optical circulator 508, to prevent inadvertently looping back add channel wavelengths, $\lambda_{ETx}$ and $\lambda_{WTx}$, onto receive ports of the east and west line cards 352, 350. For example, the third optical circulator 506 includes a first port 518-1 to receive add channel wavelengths sent via west line card 350, a second port 518-2 for sending/receiving add channel and drop channel wavelengths via the first optical path, and a third port 518-3 to couple drop channel wavelengths to a receive port of the line card 350. Thus, the third optical circulator 506 receives add channel wavelengths via the first port 518-1 and passes signals via the first optical path via the second port 518-2. At the same time, drop channels received via the first optical path are received via the second port 518-2 and provided to the west line card 350 via the third port 518-3. The fourth optical circulator 508 is configured substantially similar to that of the third optical circulator 506, and therefore, discussion pertaining to the first, second and third port 520-1, 520-2, and 520-3, respectively, will not be repeated for brevity.

The branching configuration 500 may provide topside recovery in the event of a fault along one of the first or second optical paths via jumpers 510-2 and 510-3. For example, in the event of a fault along the first optical path, jumpers 510-1 and 510-2 may be switched such that the second optical path is optically coupled to the west line card 350. Likewise, jumpers 510-3 and 510-4 may be switched to couple the first optical path to the east line card 352. Accordingly, each of the east and west line cards 352 and 350, respectively, may continue to send and receive associated channel wavelengths in the event of a fault condition occurring on the first or second optical path.

Figure 6:
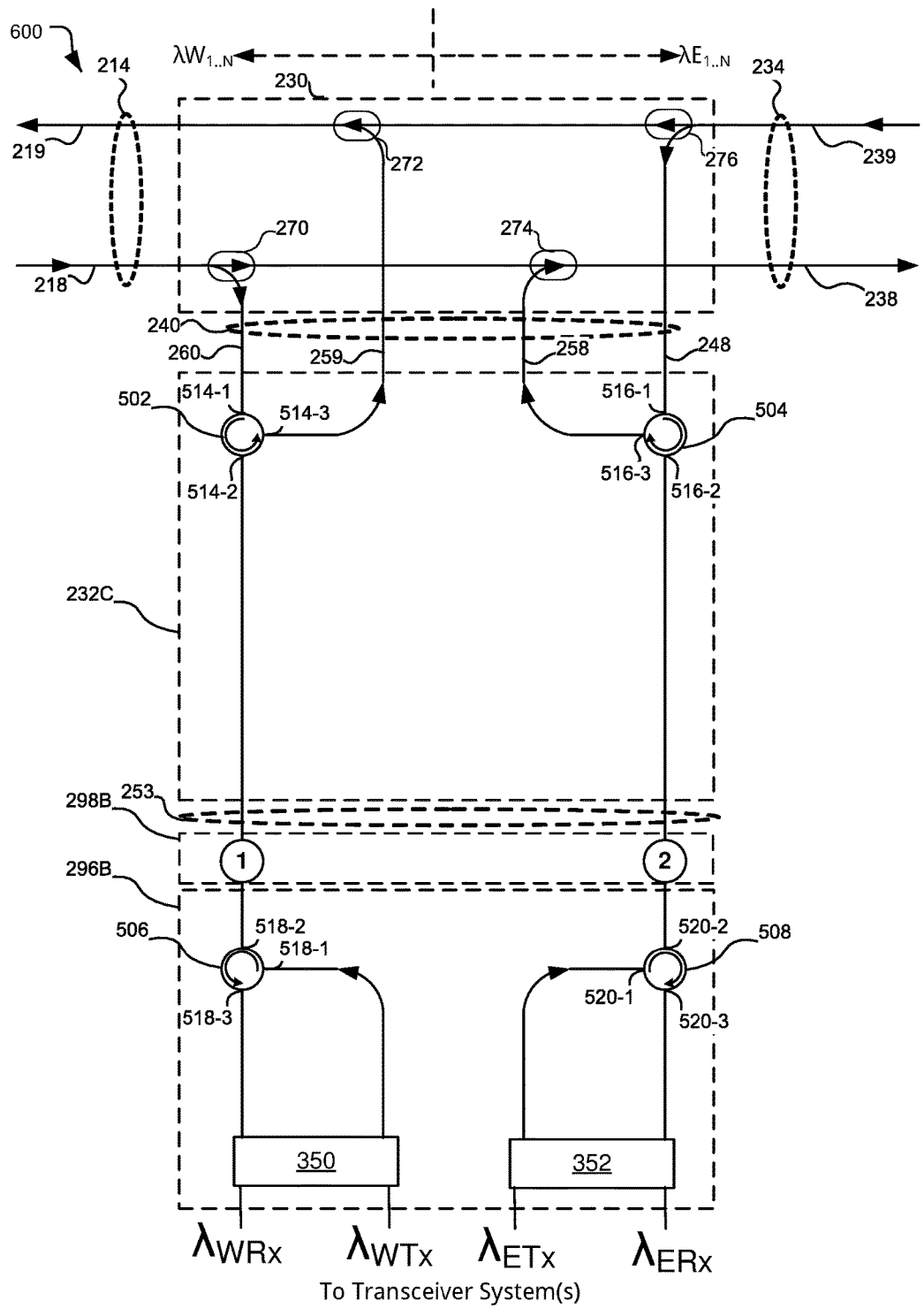
FIG. 6 illustrates another example branching configuration having bi-directional optical paths to reduce the number of required optical paths allocated within a subsea umbilical cable to support branch path communication, in accordance with an embodiment of the present disclosure.

FIG. 6 shows another example branching configuration 600 in accordance with an embodiment of the present disclosure. As shown, the branching configuration 600 includes a configuration substantially similar to that of the branching configuration 500 of FIG. 5, the description of which will not be repeated for brevity. However, and as further shown, the branching configuration 600 includes a PWF unit 232C which includes two optical paths without an optical coupling member. In addition, branch terminal equipment 296B does not include optical jumpers. The first and second optical paths thus remain isolated from each another but are configured to each support bi-directional communication for add and drop channels via a single optical path, e.g., a single fiber. For example, the first optical path supports both add and drop channels $\lambda_{WTx}$ and $\lambda_{WRx}$, respectively, for sending and receiving channel wavelengths via west line card 350. Likewise, the second optical path supports both add and drop channels $\lambda_{ETx}$ and $\lambda_{ERx}$, respectively, for sending and receiving channel wavelengths via the east line card 352. Accordingly, the number of optical paths allocated within the subsea umbilical cable 298B is reduced to a total of two (2) optical paths.

Figure 7:
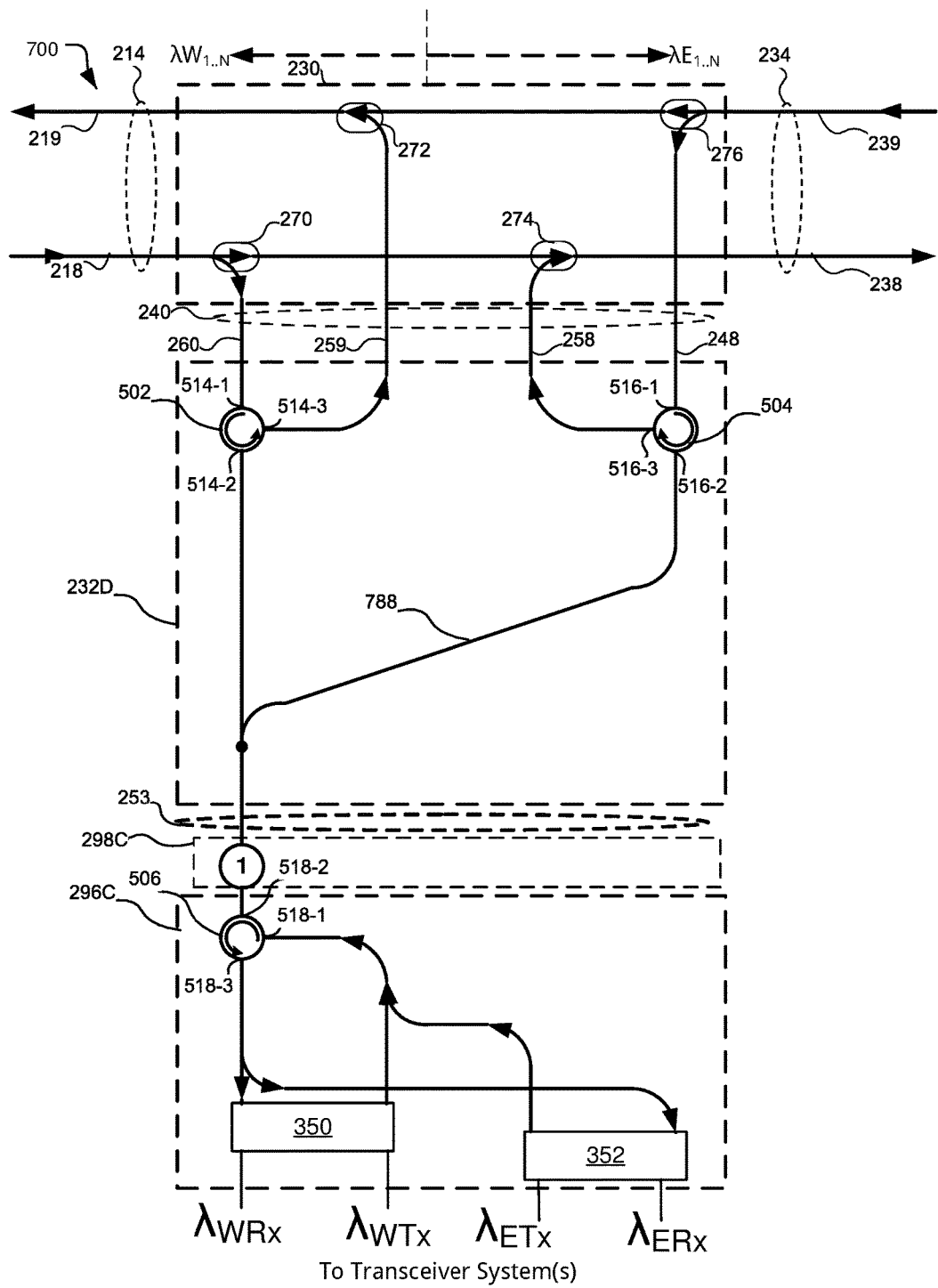
FIG. 7 illustrates another branching configuration having bi-directional optical paths to reduce the number of required optical paths allocated within a subsea umbilical cable to a single optical path, in accordance with an embodiment of the present disclosure.

FIG. 7 shows another example branching configuration 700 in accordance with an embodiment of the present disclosure. As shown, the branching configuration 700 includes a PWF unit 232D configured to terminate branch fibers 260, 259, 258, and 248 into a single optical path, and more particularly, into the first optical path denoted as (1). The PWF unit 232D includes the second port 516-2 of the second optical circulator 504 coupled via optical path 788 to the first optical path. Accordingly, the terminal equipment 296C uses a single optical path, e.g., the first optical path, provided by the subsea umbilical cable 298C to send and receive add channel and drop channel wavelengths $\lambda_{WTx}/\lambda_{WRx}$ and $\lambda_{ETx}/\lambda_{ERx}$, respectively.

In accordance with an aspect of the present disclosure a wavelength division multiplexed (WDM) optical system is disclosed. The WDM optical system comprising at least one trunk terminal configured to provide a trunk signal on a trunk path, the trunk signal occupying a plurality of channel wavelengths, at least one branch terminal configured to provide a branch signal on a branch path, the branch signal occupying at least one channel wavelength; and at least one branching configuration located in an undersea environment and coupled between the trunk path and the branch path for receiving the trunk signal and the branch signal and for adding and dropping channel wavelengths to and from the trunk path, the branching configuration comprising a branching unit, and a plurality of optical paths coupled between the branching unit and at least one branch terminal, the plurality of optical paths comprising at least a first optical path cross-coupled to a second optical path to redundantly introduce signals onto both the first and second optical paths.

In accordance with another aspect of the present disclosure a wavelength division multiplexed (WDM) optical system is disclosed. The WDM optical system comprising a predetermined wavelength filter (PWF) unit disposed in an undersea environment and configured to couple to a branching unit and a branch terminal, the PWF unit comprising a plurality of optical paths to couple between the branching unit and the branch terminal, wherein at least a first optical path of the plurality of optical paths is cross-coupled to a second optical path of the plurality of optical paths to redundantly introduce signals onto both the first and second optical paths.

In accordance with another aspect of the present disclosure a method for providing fault tolerance within a branch of a WDM optical system is disclosed. The method comprising coupling at least one branching unit to a trunk path, coupling a plurality of optical paths between the branching unit and a branch terminal to form a branch path, wherein at least a portion of the branch path is provided by a subsea umbilical cable, and cross-coupling at least a first optical path and a second optical path of the plurality of optical paths to redundantly introduce signals onto both the first and second optical paths, wherein the first and second optical paths are cross-coupled at a position along the branch path between the branching unit and the subsea umbilical cable.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Also features of any embodiment described herein may be combined or substituted for features of any other embodiment described herein.

What is claimed is:

1. A wavelength division multiplexed (WDM) optical system comprising:
   at least one trunk terminal configured to provide a trunk signal on a trunk path, the trunk signal occupying a plurality of channel wavelengths;
   at least one branch terminal configured to provide a branch signal on a branch path, the branch signal occupying at least one channel wavelength of the plurality of channel wavelengths; and
   at least one branching configuration located in an undersea environment and coupled between the trunk path and the branch path for receiving the trunk signal and the branch signal and for adding and dropping channel wavelengths to and from the trunk path, the branching configuration comprising:
   a branching unit; and
   a plurality of optical paths for communicating signals between the branching unit and the at least one branch terminal, the plurality of optical paths comprising at least a first optical path cross-coupled to a second optical path to redundantly introduce the same signals onto both the first and the second optical paths in the same direction towards the branching unit or the at least one branch terminal.

2. The WDM optical system of claim 1, further comprising a subsea umbilical assembly coupled between the branching unit and the at least one branch terminal, wherein the subsea umbilical assembly includes a subsea umbilical cable that provides at least a portion of the first and the second optical paths.

3. The WDM optical system of claim 2, further comprising a riser device to provide at least a portion of the subsea umbilical cable topside for coupling with the at least one branch terminal.

4. The WDM optical system of claim 2, wherein the at least one branch terminal includes at least a first line card optically coupled to the first optical path for sending and/or receiving first add and drop channel wavelengths, respectively, via the trunk path in a first direction, and a second line card optically coupled to the second optical path for sending and/or receiving second add and drop channel wavelengths, respectively, via the trunk path in a second direction, the first direction being opposite the second direction.

5. The WDM optical system of claim 4, further comprising a jumper device located in the at least one branch terminal, the jumper device allowing the first line card to couple to the second optical path to continue to send and/or receive the first add and drop channel wavelengths associated with the first optical path in response to a fault condition within the subsea umbilical assembly that degrades performance of the first optical path.

6. The WDM optical system of claim 5, wherein the jumper device automatically optically couples the first line card to the second optical path in response to monitoring equipment of the at least one branch terminal identifying the fault condition.

7. The WDM optical system of claim 5, wherein the jumper device is manually switched to optically couple the first line card to the second optical path.

8. The WDM optical system of claim 5, wherein the subsea umbilical assembly comprises an umbilical termination assembly (UTA), and wherein the first optical path is optically cross-coupled to the second optical path within the UTA or within a connector configured to couple the UTA to the subsea umbilical cable.

9. The WDM optical system of claim 1, wherein the first optical path is cross-coupled to the second optical path using a broadband thin-film coupler device.

10. The WDM optical system of claim 1, further comprising a predetermined wavelength filter (PWF) unit coupled to the branching unit, the PWF unit being physically separated from the branching unit and the at least one branch terminal, the PWF unit comprising at least one filter configured to selectively filter the branch signal or the trunk signal for adding or dropping the channel wavelengths.

11. The WDM optical system of claim 10, wherein the first optical path is cross-coupled to the second optical path within the PWF unit or within a connector associated with the PWF unit.

12. The WDM optical system of claim 10, wherein the PWF unit is located a distance from the branching unit sufficient to allow the PWF unit to be extracted from the undersea environment without extracting the branching unit from the undersea environment and without decoupling the PWF unit from the branching unit.

13. The WDM optical system of claim 10, wherein the PWF unit is located at least 30 meters from the branching unit and at least 30 meters from the at least one branch terminal.

14. A wavelength division multiplexed (WDM) optical system comprising:
 a predetermined wavelength filter (PWF) unit disposed in an undersea environment and configured to couple to a branching unit and a branch terminal, the PWF unit comprising:
  a plurality of optical paths for communicating signals between the branching unit and the branch terminal, wherein at least a first optical path of the plurality of optical paths is cross-coupled to a second optical path of the plurality of optical paths to redundantly introduce the same signals onto both the first and second optical paths in the same direction towards the branching unit or the at least one branch terminal.

15. The WDM optical system of claim 14, wherein the PWF unit comprises at least one filter configured to provide optical add drop multiplexing (OADM) functionality.

16. The WDM optical system of claim 14, wherein the PWF unit is configured to be implemented within a branching configuration located in the undersea environment.

17. The WDM optical system of claim 14, further comprising the branch terminal, the branch terminal being coupled to the PWF unit via a subsea umbilical cable and the branch terminal comprising at least a first and a second line card optically coupled to the first and the second optical paths, respectively, and wherein the branch terminal includes at least one jumper device, the at least one jumper device allowing the first line card to optically couple to the second optical path to continue to send and/or receive channel wavelengths associated with the first optical path in response to a fault condition within the subsea umbilical cable that degrades performance of the first optical path.

18. A method for providing fault tolerance within a branch of a Wavelength Division Multiplexed (WDM) optical system, the method comprising:
 coupling at least one branching unit to a trunk path;
 coupling a plurality of optical paths between the at least one branching unit and a branch terminal to form a branch path, wherein at least a portion of the branch path is provided by a subsea umbilical cable; and
 cross-coupling at least a first optical path and a second optical path of the plurality of optical paths to redundantly introduce the same signals onto both the first and the second optical paths in the same direction towards the branching unit or the at least one branch terminal, wherein the first and second optical paths are cross-coupled at a position along the branch path between the at least one branching unit and the subsea umbilical cable.

19. The method of claim 18, further comprising:
 coupling the first optical path to a first line card of the branch terminal;
 coupling the second optical path to a second line card of the branch terminal,
 wherein the first line card is configured to send and receive first add and drop channel wavelengths, respectively, along the trunk path in a first direction, and the second line card is configured to send and receive second add and drop channel wavelengths, respectively, along the trunk path in a second direction, the first direction being opposite the second direction.

20. The method of claim 19, further comprising:
 identifying, by monitoring equipment associated with the branch terminal, a fault condition occurring along the first optical path; and
 in response to identifying the fault condition, coupling the first line card to the second optical path to continue to send and/or receive the first add and drop channel wavelengths associated with the first optical path.

\* \* \* \* \*